F. A. PRIDMORE.
STRUCTURE FOR EDUCATIONAL AND RECREATIVE PURPOSES.
APPLICATION FILED MAY 28, 1914.
1,137,167.
Patented Apr. 27, 1915.
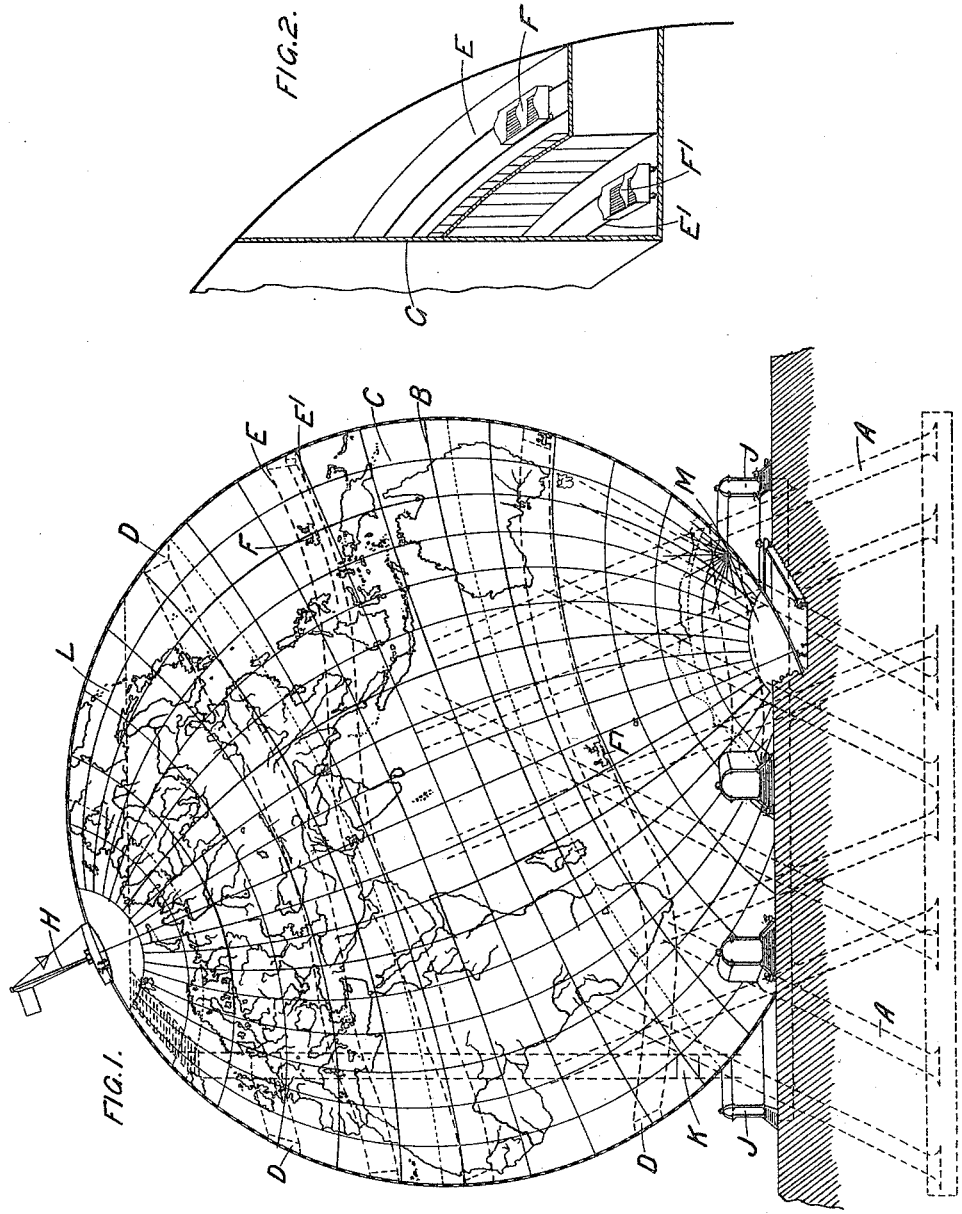
WITNESSES.
INVENTOR.

UNITED STATES PATENT OFFICE.

FRANK ANDREWS PRIDMORE, OF LONDON, ENGLAND.

STRUCTURE FOR EDUCATIONAL AND RECREATIVE PURPOSES.

1,137,167. Specification of Letters Patent. Patented Apr. 27, 1915.

Application filed May 28, 1914. Serial No. 841,630.

*To all whom it may concern:*

Be it known that I, FRANK ANDREWS PRIDMORE, subject of the King of England, residing at London, in England, have invented a certain new and useful Structure for Educational and Recreative Purposes, of which the following is a specification.

This invention relates to structures of substantially spherical form for educational and recreative purposes, the exterior of the structure being made to represent the oceans and continents of the world on a large scale, while the interior serves to accommodate various exhibits and the like. In such structures hitherto proposed the shell or sphere has been intended to rotate relatively to stationary platforms disposed within it or the platforms have been rotary and the sphere stationary.

According to this invention the whole structure is stationary and the interior contains just below the crust or covering one or more tracks, corridors or railways, preferably starting from some point in the Northern Hemisphere and ending at the South Pole, this track going around the sphere several times in such a way as to enable passengers or pedestrians to visit the chief places of interest on the route followed by the track which is made to touch various continents, countries or towns represented by the map of the world borne by the exterior of the sphere. Preferably the structure is formed from a network or shell of girders in such a way that these members constitute the lines of latitude and longitude, the ties or internal supporting members being so arranged as to interfere as little as possible with the space within the sphere. The network or shell is provided with a covering of glass or some other transparent material to represent the seas and oceans and with opaque material to represent the various continents and islands, the whole being so arranged as to be an accurate representation to scale of the earth and the various continents and oceans.

The whole structure is preferably supported in such a manner that the inclination of the poles of the globe is similar to that of the poles of the earth. In this way the South Pole will not be directly under the ground and will be visible from below. Those portions of the covering representing land may show the chief mountain ranges, rivers and other geographical and political divisions, various territories being colored to represent the nation to whom they belong. The actual poles and magnetic poles also will be indicated on the exterior of the sphere and the chief lines of communication between various places or countries whether by land or water, would be marked and in some cases cable lines also indicated.

The size of the structure will naturally vary but it is preferably made of such dimensions as to enable a large number of inland towns and ports to be satisfactorily indicated. The base of the sphere is preferably sunk in the ground to an extent to hide the foundation of the structure but not so as to interfere with the South Pole which would be readily seen by persons walking about below the sphere. If desired, however, buildings may be provided on the ground around the base of the globe to prevent persons passing below the overhanging portions of the latter, these buildings containing refreshment rooms, side-shows, exhibits or the like. If the structure were built to a scale of half an inch to a mile its diameter would be about three hundred and thirty feet and its height three hundred and ten feet. Alternatively the globe may be built to a scale of one inch to three miles, in which case its height would be about two hundred and seven feet.

So far the exterior appearance of the structure has been described and from this description it will be seen that the structure would be of an educational and scientific nature since it would indicate on a large scale and in an accurate manner the relative positions of the various continents, the routes by which various places and continents are reached and other lines of communication such as cable lines and the like. Thus scope will be given by such a structure to various transport and cable companies to indicate to everyone outside the structure the routes along which their systems extend.

As already stated the structure of the sphere is such that as much free space as possible is left within it. Preferably the inner wall of the sphere represents in a manner similar to the exterior of the structure, the relative positions of the continents and oceans, in other words the inner surface of the glass or other transparent material representing the sea forms a means for lighting and ventilating the interior of the sphere, while the opaque portions as before represent to the correct scale the various countries.

Preferably a suitable number of lifts or elevators will be provided within the sphere, as in previous structures, to convey passengers to the top of the sphere or in the present instance to the point at which the track or corridor commences. If desired, two or more parallel tracks may be formed, both preferably immediately inside the covering or crust one of these tracks serving as a path for pedestrians, another constituting say, a slowly moving platform with or without seats or cars at suitable intervals, while a third track might be provided for rapidly moving cars, employed mainly for recreative purposes. At intervals in the course of the track stations or stopping places would be formed, these stations being at equal distances apart if desired, to enable the moving platform to be stopped at regular intervals of time. Stations would preferably be constructed at places of interest in the length of the route and at each stopping place there would be provided a showroom, exhibition or museum giving examples of the characteristics of the country or place at which the stop was made and fulfilling an educational, scientific or advertising purpose. Such depots would be controlled by the country, colony or town which they represented and the exhibits therein would constitute a permanent indication of the leading characteristics of the district or place represented. In addition to the track, moving pathway or railway above described the sphere would contain, preferably in the upper portion thereof and below the North Pole, a large concert hall, skating rink or like assembly room, while further, there would be ample space within the interior for lecture rooms, trade exhibits and the numerous recreative side-shows as well as scientific and educational exhibits such as are usually found at exhibitions.

The construction will allow persons to walk on the surface of the globe at the North Pole where a wireless installation could conveniently be erected and messages sent to different parts of the country or to sub-stations within the sphere representing wireless stations in different parts of the world. The ground below the sphere at the South Pole would be made to represent the surroundings in that locality and exhibits would be arranged of polar expeditions and of geological and other specimens which such expeditions have discovered. At night the globe would be suitably illuminated both from within and on the exterior thereon, the outlines of continents and the principal lighthouses being indicated where the scale allowed of this and the poles being similarly indicated.

In the accompanying drawings, Figure 1 is a side elevation of the globe showing the Eastern Hemisphere, and Fig. 2 a section showing two tracks and their position below the outer crust of the globe.

The structure is shown as supported by steel stanchions diagrammatically indicated at A in Fig. 1, and comprises a shell formed by longitudinal and transverse girders which may conveniently constitute the lines of latitude B and longitude C. Starting from some point in the Northern Hemisphere and ending at the South Pole is a corridor D provided with two tracks E, E', carrying rails for a slow moving car F and a rapidly moving car F' respectively.

The outer crust of the globe is composed of some opaque material to represent the continents and by glass or other transparent material to represent the oceans, the inner wall G of the corridor being provided with well drawn panoramic maps, scenery or the like to indicate the country through which the passengers are supposed to be passing. At the North Pole the wireless installation H is preferably provided and a skating rink may be formed on the flat portion around the pole. Access to the interior of the globe can be made through suitable entrances J where lifts K convey visitors to the upper portion of the globe which is conveniently in the form of a skating rink, concert hall or other assembly room indicated at L in Fig. 1. As shown by Fig. 1 of the drawings the south magnetic pole is indicated at M and the South Pole if desired may be rendered visible from below if the axis of the globe is given the proper inclination as illustrated. The globe need not necessarily have its axis inclined, if the nature of the internal framework renders this difficult. The internal girders are in all cases preferably arranged so as to interfere as little as possible with the free space within the structure.

The steam ship routes, cable lines, lighthouses, important towns, etc., are preferably indicated in the manner already referred to and the interior is utilized in any of the various ways previously mentioned to suit different requirements.

It will be appreciated that the exterior can be put to almost limitless use while, within the globe are housed the educational, scientific, commercial and recreative features which are usually found in any exhibition. Further, though preferably immediately beneath the crust or covering of the sphere, the track, pathway or railway may follow a sinuous path throughout the entire interior of the sphere serving as a means of communication between the various exhibits and in this way increasing the length of the journey. Such an arrangement could be usefully employed in the case of a scenic or other railway intended mainly for recreative purposes.

What I claim as my invention and desire to secure by Letters Patent is:—

1. In a structure for educational and recreative purposes, the combination of a supporting framework, a substantially spherical casing therefor comprising transparent sections representing the oceans and seas and opaque sections representing the continents and islands of the world, a corridor extending around the sphere immediately within said casing, and a wall adjacent to the inner side of said corridor, for the purpose described.

2. In a structure for educational and recreative purposes, the combination of a supporting framework, a spherical casing therefor having transparent sections representing the oceans and seas and opaque sections representing the continents and islands, the axis of said casing being inclined to represent the poles of the earth, and a sinuous corridor extending from top to bottom of the sphere immediately within the casing, and a wall adjacent to the inner side of said corridor, for the purpose described.

3. In a structure for educational and recreative purposes, the combination of a supporting framework, a spherical casing therefor having transparent sections representing the oceans and seas, opaque sections representing the continents and islands, and an inclined axis representing the poles of the earth, a sinuous corridor extending from top to bottom of the sphere immediately within the casing, and a chamber below the South Pole, for the purpose described.

4. In a structure for educational and recreative purposes, the combination of a supporting framework of spherical outline, and a substantially spherical casing for said framework comprising transparent sections representing the oceans and seas and opaque sections representing the continents and islands of the world, the girders of said framework being arranged to indicate the lines of longitude and latitude.

5. In a structure for educational and recreative purposes, the combination of a supporting framework of spherical outline, a substantially spherical outer casing for said framework comprising transparent material to represent the oceans and seas and opaque material to represent the continents and islands of the world, the longitudinal and transverse girders of said supporting framework indicating the lines of longitude and latitude, and a track carried by said framework and extending around the sphere several times immediately within the casing.

6. In a stationary structure for educational and recreative purposes, the combination of a supporting framework constituting a spherical cage or basket, a substantially spherical outer casing for said framework comprising transparent sections representing the oceans and seas and opaque sections representing the continents and islands of the world, the girders of said supporting framework being arranged to indicate the lines of latitude and longitude, and a plurality of concentric tracks carried by said framework and extending around the sphere several times immediately within the casing.

In testimony whereof I have signed my name to this specification in the presence of two subscribing witnesses.

FRANK ANDREWS PRIDMORE.

Witnesses:
 R. H. HARRISS,
 G. NEWMAN.

Copies of this patent may be obtained for five cents each, by addressing the "Commissioner of Patents, Washington, D. C."